US012544941B2

(12) United States Patent
Ryu

(10) Patent No.: US 12,544,941 B2
(45) Date of Patent: Feb. 10, 2026

(54) DEVICE FOR ADJUSTING SPACE OF SCISSORS

(71) Applicant: Seok Kyu Ryu, Seoul (KR)

(72) Inventor: Seok Kyu Ryu, Seoul (KR)

( * ) Notice: Subject to any disclaimer, the term of this patent is extended or adjusted under 35 U.S.C. 154(b) by 163 days.

(21) Appl. No.: 18/562,328

(22) PCT Filed: May 19, 2022

(86) PCT No.: PCT/KR2022/007147
§ 371 (c)(1),
(2) Date: Nov. 19, 2023

(87) PCT Pub. No.: WO2022/250374
PCT Pub. Date: Dec. 1, 2022

(65) Prior Publication Data

US 2024/0246250 A1 Jul. 25, 2024

(30) Foreign Application Priority Data

May 26, 2021 (KR) ........................ 10-2021-0067725

(51) Int. Cl.
*B26B 13/24* (2006.01)
*B26B 13/28* (2006.01)
*F16C 19/08* (2006.01)

(52) U.S. Cl.
CPC .............. *B26B 13/24* (2013.01); *B26B 13/28* (2013.01); *F16C 19/08* (2013.01)

(58) Field of Classification Search
CPC ......... B26B 13/24; B26B 13/22; B26B 13/00; B26B 13/12; B26B 13/14–18
USPC .................................................. 403/119–163
See application file for complete search history.

(56) References Cited

U.S. PATENT DOCUMENTS

| | | | | |
|---|---|---|---|---|
| 1,799,950 A * | 4/1931 | Boyd | B26B 13/28 | 403/163 |
| 3,861,038 A * | 1/1975 | Charles | B26B 13/285 | 30/341 |
| 5,628,116 A * | 5/1997 | Kohno | B26B 13/28 | 30/267 |
| 5,692,305 A * | 12/1997 | Roskam | B26B 13/285 | 30/267 |

(Continued)

FOREIGN PATENT DOCUMENTS

| | | |
|---|---|---|
| JP | 2012-029923 A | 2/2012 |
| JP | 2012-130493 A | 7/2012 |

(Continued)

OTHER PUBLICATIONS

International Search Report for PCT/KR2022/007147 mailed Jul. 22, 2022 from Korean Intellectual Property Office.

*Primary Examiner* — Adam J Eiseman
*Assistant Examiner* — Richard D Crosby, Jr.
(74) *Attorney, Agent, or Firm* — Revolution IP, PLLC

(57) ABSTRACT

The present invention relates to scissors, more specifically to a distance adjusting device for scissors that is configured to have a fixing part passing through an open portion of a first scissor blade and a second scissor blade to couple the first scissor blade and the second scissor blade to each other, a pair of ball bearings adapted to allow the fixing part to be inserted thereinto, a thrust bearing disposed between the pair of ball bearings, and pressurizing bars inserted into one side of the first scissor blade to pressurize the thrust bearing.

8 Claims, 7 Drawing Sheets

(56) References Cited

U.S. PATENT DOCUMENTS

| | | | | |
|---|---|---|---|---|
| 5,860,215 | A * | 1/1999 | Roskam | B26B 13/26 30/256 |
| 8,756,818 | B2 * | 6/2014 | Fitraki | B26B 13/28 30/267 |
| 2006/0168822 | A1 * | 8/2006 | Kaye | B26B 13/28 30/341 |
| 2007/0124942 | A1 * | 6/2007 | Nenadich | B26B 13/24 30/266 |
| 2012/0311872 | A1 * | 12/2012 | Wang | A01G 3/02 30/252 |
| 2015/0101198 | A1 * | 4/2015 | Yagyu | B26B 13/285 30/261 |
| 2019/0248033 | A1 * | 8/2019 | Choi | B26B 11/005 |
| 2019/0283263 | A1 * | 9/2019 | Vermette | B26B 13/12 |

FOREIGN PATENT DOCUMENTS

| | | | |
|---|---|---|---|
| JP | 2017-158616 | A | 9/2017 |
| JP | 2019-213610 | A | 12/2019 |
| KR | 20-0284239 | Y1 | 8/2002 |
| KR | 20-0456438 | Y1 | 10/2011 |
| KR | 10-1540882 | B1 | 7/2015 |
| KR | 20-2017-0001149 | U | 3/2017 |

* cited by examiner

DEVICE FOR ADJUSTING SPACE OF SCISSORS

This application is a National Stage Application of PCT International Patent Application No. PCT/KR2022/007147 filed on May 19, 2022, under 35 U.S.C. § 371, which claims priority to Korean Patent Application No. 10-2021-0067725 filed on May 26, 2021, respectively, which are all hereby incorporated by reference in their entirety.

TECHNICAL FIELD

The present invention relates to scissors, more specifically to a distance adjusting device for scissors that is configured to have a fixing part passing through an open portion of a first scissor blade and a second scissor blade to couple the first scissor blade and the second scissor blade to each other, a pair of ball bearings adapted to allow the fixing part to be inserted thereinto, a thrust bearing disposed between the pair of ball bearings, and pressurizing bars inserted into one side of the first scissor blade to pressurize the thrust bearing, so that a distance between the first scissor blade and the second scissor blade is adjusted by means of the fixing part and the pressurizing bars, and even though the distance between both scissor blades is varied, the distance adjusting device can adjust the distance easily, thereby minimizing a resistance between the scissor blades and keeping hair cutting performance of the scissors.

BACKGROUND ART

Generally, as shown in FIG. 1, scissors include a first scissor blade B1 and a second scissor blade B2 for hair cutting. The first scissor blade B1 and the second scissor blade B2 are rotatable to each other by means of a fixing part B3 in a state where they cross each other. The first scissor blade B1 is provided with a first operating ring R1, and the second scissor blade B2 with a second operating ring R2. After a user's fingers are inserted into the first operating ring R1 and the second operating ring R2, the first operating ring R1 and the second operating ring R2 operate to perform hair cutting.

For example, in a state where hair is fixed to the second scissor blade B2, the first scissor blade B1 cuts the hair, while moving to the second scissor blade B2. However, a distance between the first scissor blade B1 and the second scissor blade B2 may be varied due to the use of the scissors. For example, if the distance between the first scissor blade B1 and the second scissor blade B2 increases, a gap between them occurs to make hair cutting performance deteriorated badly, and contrarily, if the distance between the first scissor blade B1 and the second scissor blade B2 decreases, a resistance between the blades increases so that it is hard to open and close the scissors, thereby causing many inconveniences of use.

Further, the above-mentioned scissors themselves are widely known, especially described in the following prior art literatures, and therefore, the explanation and drawings of the scissors will be avoided.

DISCLOSURE OF THE INVENTION

Technical Problems to be Solved

Accordingly, the present disclosure has been made in view of the above-mentioned problems occurring in the related art, and it is an object of the present invention to provide a distance adjusting device for scissors that is configured to have a fixing part passing through an open portion of a first scissor blade and a second scissor blade to couple the first scissor blade and the second scissor blade to each other, a pair of ball bearings adapted to allow the fixing part to be inserted thereinto, a thrust bearing disposed between the pair of ball bearings, and pressurizing bars inserted into one side of the first scissor blade to pressurize the thrust bearing, so that a distance between the first scissor blade and the second scissor blade is adjusted by means of the fixing part and the pressurizing bars, and even though the distance between both scissor blades is varied, the distance adjusting device can adjust the distance easily, thereby adjusting the tension between the scissor blades to keep the hair cutting performance of the scissors and improve the conveniences of use of the scissors.

The technical problems to be achieved through the present invention are not limited as mentioned above, and other technical problems not mentioned herein will be obviously understood by one of ordinary skill in the art through the following description.

Technical Solutions

To accomplish the above-mentioned objects, according to the present invention, there is provided a distance adjusting device for scissors having a first scissor blade 500 and a second scissor blade 600 for hair cutting, the distance adjusting device including: a fixing part 300 passing through an open portion 0 of the first scissor blade 500 and the second scissor blade 600 to couple the first scissor blade 500 and the second scissor blade 600 to each other; a pair of ball bearings 100 coming into close contact with the inner peripheral surface of the open portion in such a way as to insert the fixing part thereinto; and a distance adjusting means disposed between the pair of ball bearings 100 to adjust a distance between the first scissor blade 500 and the second scissor blade 600.

The distance adjusting means may include a thrust bearing 200 disposed between the pair of ball bearings 100 and pressurizing bars 400 inserted into one side of the first scissor blade 500 to pressurize the thrust bearing 200 so that the distance between the first scissor blade 500 and the second scissor blade 600 is adjusted by means of the forward and backward movements of the pressurizing bars 400.

The first scissor blade 500 may include a plate-shaped first scissor blade body 510 on which a first open portion 01 is formed and a first locking projection 520 protruding inward from the side surface of the first open portion 01 facing the second scissor blade 600, the second scissor blade 600 may include a plate-shaped second scissor blade body 610 on which a second open portion 02 is formed and a second locking projection 620 protruding inward from the side surface of the second open portion 02 facing the first scissor blade 500, the first open portion 01 and the second open portion 02 communicating with each other to form the open portion 0, and portions of outer races of the ball bearings 100 may protrude to be locked onto the first locking projection 520 and the second locking projection 620.

The ball bearings 100 may include a first ball bearing 110 disposed on the first open portion 01 and a second ball bearing 120 disposed on the second open portion 02, the first ball bearing 110 may include a first protrusion 111 protruding from the portion of the outer race thereof in such a way as to be locked onto the first locking projection 520, the second ball bearing 120 may include a second protrusion 121 protruding from the portion of the outer race thereof in such a way as to be locked onto the second locking projection 620, and the thrust bearing 200 may include rolling elements 210 arranged between the first locking projection 520 and the second locking projection 620 and an upper contact plate 230 disposed inside the first locking projection 520 in such a way as to come into contact with the rolling elements 210 and having seating grooves 231 formed thereon to seat the corresponding rolling elements 210.

The first scissor blade 500 may include through holes 521 formed on the first locking projection 520 to insert the pressurizing bars 400 thereinto, each pressurizing bar 400 may include a pressurizing bar body 410 screw-coupled to the corresponding through hole 521 and an insertion groove 420 concavely formed on one side of the pressurizing bar body 410 to insert a tool thereinto, the fixing part 300 may include a first fixing part 310 inserted into the first and second open portions 01 and 02 in such a way as to come into contact with inner races of the ball bearings 100 and a second fixing part 320 insertedly screw-coupled to the inside of the first fixing part 310, the first fixing part 310 may include a first cylinder 311 inserted into the first and second open portions 01 and 02 in such a way as to allow the second fixing part 320 to be coupled to the inside thereof and a first wing 312 formed to the shape of a plate on one side periphery of the first cylinder 311 to cover the first bearing 110, and the second fixing part 320 may include a second cylinder 321 screw-coupled to the inside of the first cylinder 311 and a second wing 322 formed to the shape of a plate on the other side periphery of the second cylinder 321 to cover the second bearing 120.

A relation among a radius R2 from a center line CL of the first open portion 01 to the end of the first wing 312, a radius R3 from the center line CL of the first open portion 01 to the underside of each pressurizing bar body 410, and a radius R1 from the center line CL of the first open portion 01 to the underside of each insertion groove 420 may satisfy the following mathematical expression 1:

$$R3<R2<R1 \quad \text{(Mathematical expression 1)}$$

The plurality of through holes 521 may be formed around the open portion 0, and the plurality of pressurizing bars 400 may be inserted correspondingly to the plurality of through holes 521.

The thrust bearing 100 may include the rolling elements 210, the upper contact plate 230, and a lower contact plate.

The lower contact plate may be replaced with the inner peripheral surface of the inwardly protruding second locking projection 620 formed unitarily with the second scissor blade 600.

Objects, characteristics and advantages of the present invention will be more clearly understood from the detailed description as will be described below and the attached drawings.

The terms used in the present invention are to be given their ordinary and customary meaning to a person of ordinary skill in the art, and are not to be limited to a special or customized meaning unless expressly so defined herein. It should be noted that the use of particular terminology when describing certain features or aspect of the disclosure should not be taken to imply that the terminology is being re-defined herein to be restricted to include any specific characteristics of the features or aspects of the disclosure with which that terminology is associated.

Advantageous Effects of the Invention

According to the present invention, even though the distance between both scissor blades is varied, the distance adjusting device can adjust the distance easily so that the tension between the scissor blades is adjusted to keep the hair cutting performance of the scissors and improve the conveniences of use of the scissors.

EMBODIMENTS OF THE INVENTION

Figure 1:
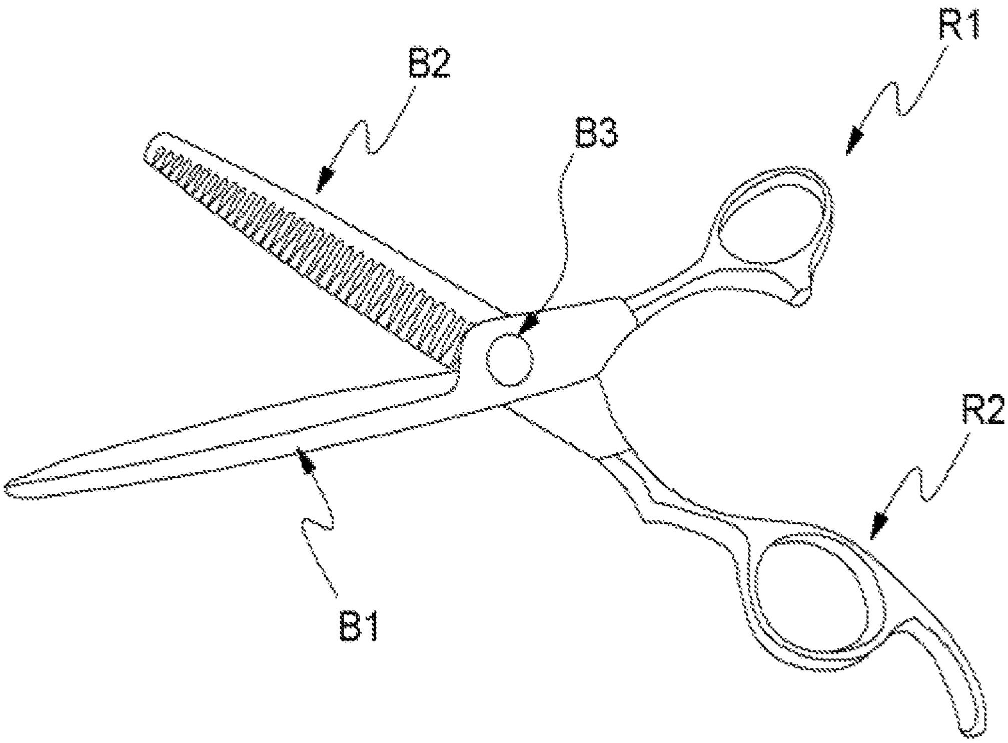
FIG. 1 is a schematic perspective view showing general scissors.
Figure 2:
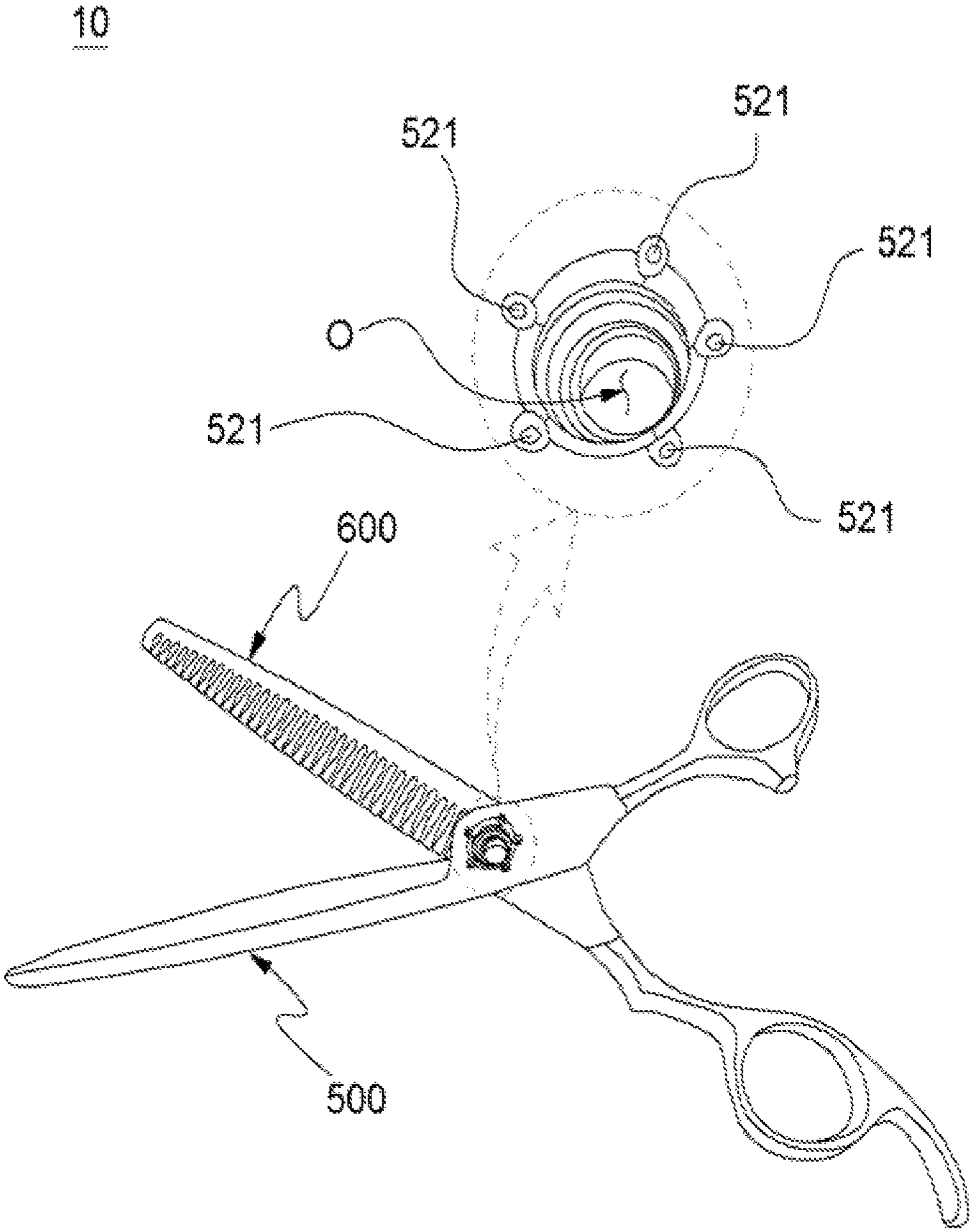
FIG. 2 is a perspective view showing scissors having a distance adjusting device according to the present invention.

The present invention is disclosed with reference to the attached drawings wherein the thicknesses of the lines or the sizes of the components shown in the drawing may be magnified for the clarity and convenience of the description.

Further, the terms as will be discussed later are defined in accordance with the functions of the present invention, but may be varied under the intention or regulation of a user or operator. Therefore, they should be defined on the basis of the whole scope of the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

As shown in FIGS. 2 to 5, scissors 10 according to the present invention have a first scissor blade 500 and a second scissor blade 600 for hair cutting. In this case, a distance adjusting device for the scissors 10 according to the present invention includes a fixing part 300 passing through an open portion 0 of the first scissor blade 500 and the second scissor blade 600 to couple the first scissor blade 500 and the second scissor blade 600 to each other, a pair of ball bearings 100 coming into close contact with the inner peripheral surface of the open portion 0 in such a way as to insert the fixing part 300 thereinto, and a distance adjusting means disposed between the pair of ball bearings 100 to adjust a distance between the first scissor blade 500 and the second scissor blade 600.

The distance adjusting means includes a thrust bearing 200 disposed between the pair of ball bearings 100 and pressurizing bars 400 inserted into one side of the first scissor blade 500 to pressurize the thrust bearing 200. The first scissor blade 500, the second scissor blade 600, and the open portion 0 are known to the conventional technologies, and therefore, repeated explanations of them will be avoided.

Figure 3:
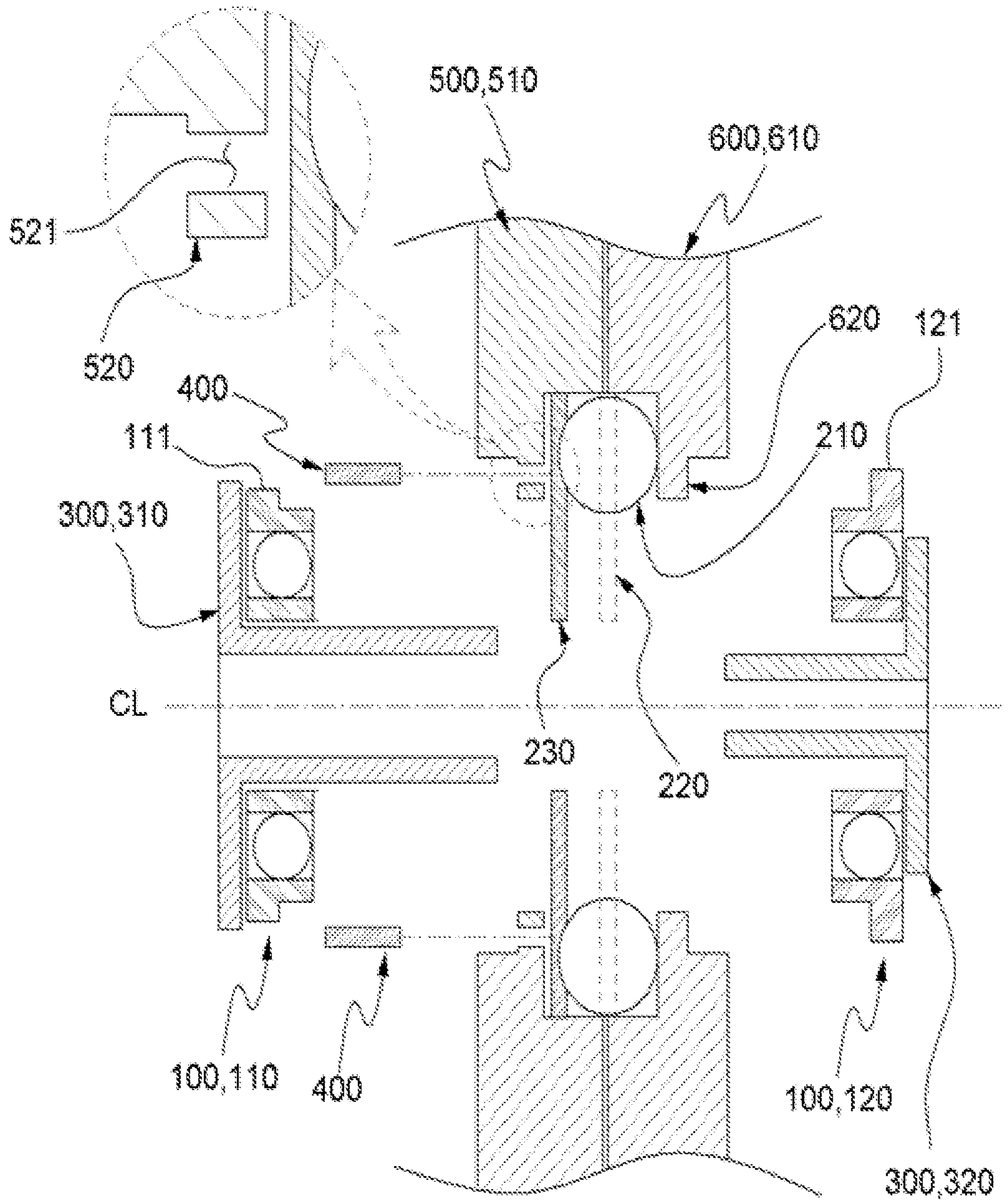
FIG. 3 is a schematic exploded view showing the distance adjusting device according to the present invention.
Figure 4:
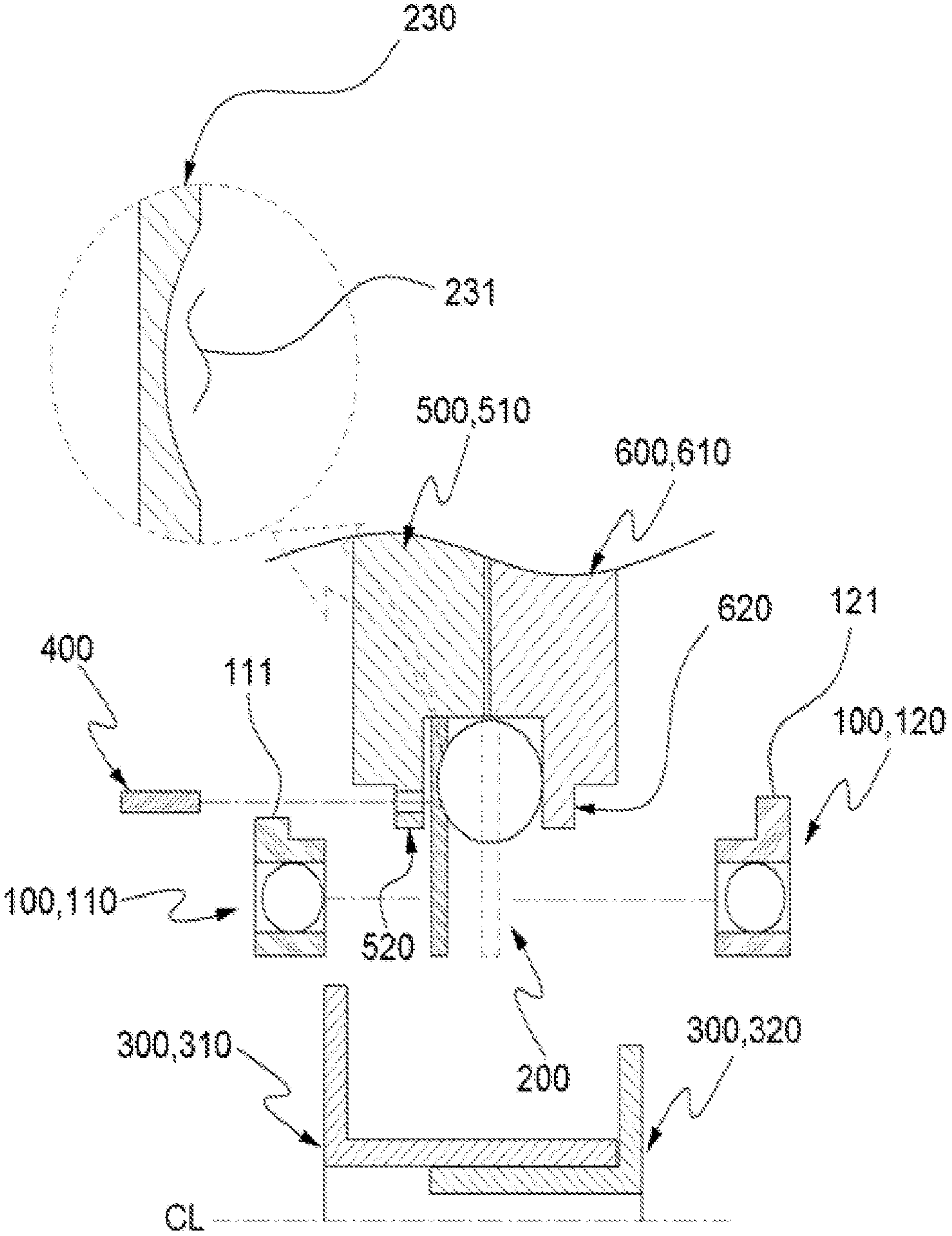
FIGS. 4 and 5 are schematic views showing the side of the distance adjusting device with respect to a center line of the scissors according to the present invention.

According to the present invention, the pair of ball bearings 100 and the thrust bearing 200 are disposed on the open portion 0. As shown in FIG. 3, the pair of ball bearings 100 is disposed on both sides of the open portion 0 in such a way as to be spaced apart from each other by a given distance. The thrust bearing 200 is located between the pair of ball bearings 100. In this case, the pressurizing bars 400 are inserted into one side of the first scissor blade 500 to pressurize the thrust bearing 200. That is, after the fixing part 300 as will be discussed later is released, the distance between the first scissor blade 500 and the second scissor blade 600 is adjusted by means of the forward and backward movements of the pressurizing bars 400. According to the present invention, in the case where the distance between the first scissor blade 500 and the second scissor blade 600 is varied due to the use of the scissors, the varied distance is easily adjusted to keep the hair cutting performance of the scissors.

The first scissor blade 500 includes a plate-shaped first scissor blade body 510 on which a first open portion 01 is formed and a first locking projection 520 protruding inward from the side surface of the first open portion 01 facing the second scissor blade 600. The second scissor blade 600 includes a plate-shaped second scissor blade body 610 on which a second open portion 02 is formed and a second locking projection 620 protruding inward from the side surface of the second open portion 02 facing the first scissor blade 500. The first open portion 01 and the second open portion 02 communicate with each other to form the open portion 0. In this case, portions of outer races of the ball bearings 100 protrude so that they are locked onto the first locking projection 520 and the second locking projection 620.

That is, the ball bearings 100 include a first ball bearing 110 disposed on the first open portion 01 and a second ball bearing 120 disposed on the second open portion 02. A first protrusion 111 protrudes from the portion of the outer race of the first ball bearing 110 and is locked onto the first locking projection 520. Further, a second protrusion 121 protrudes from the portion of the outer race of the second ball bearing 120 and is locked onto the second locking projection 620. The first protrusion 111 protrudes from the outer periphery (the left side in the drawings) in a thickness direction of the outer race of the first ball bearing 110, and the second protrusion 121 protrudes from the outer periphery (the right side in the drawings) in a thickness direction of the outer race of the second ball bearing 120. The first protrusion 111 and the second protrusion 121 are locked correspondingly onto the first locking projection 520 and the second locking projection 620.

The thrust bearing 200 is disposed between the first bearing 110 and the second bearing 120, that is, between the first locking projection 520 and the second locking projection 620. The thrust bearing 200 includes rolling elements 210 and an upper contact plate 230 disposed inside the first locking projection 520 in such a way as to come into contact with the rolling elements 210. The rolling elements 210 are fixed by means of well-known retainers 220. According to the present invention, the upper contact plate 230 is disposed only on one side of the thrust bearing 200, unlike conventional general thrust bearings. If the contact plates are disposed on both sides of the thrust bearing 200, like the conventional thrust bearings, the thrust bearing 200 becomes thickened. To avoid this, the upper contact plate 230 is disposed only on one sides of the rolling elements 210. According to the present invention, the upper contact plate 230 has seating grooves 231 formed thereon to seat the corresponding rolling elements 210.

Further, through holes 521 are formed on the first locking projection 520 of the first scissor blade 500 to insert the pressurizing bars 400 thereinto. Each pressurizing bar 400 includes a pressurizing bar body 410 screw-coupled to the corresponding through hole 521 and an insertion groove 420 concavely formed on one side of the pressurizing bar body 410 to insert a tool thereinto. That is, the first bearing 110 and the second bearing 120 are disposed correspondingly on the first open portion 01 and the second open portion 02. The first protrusion 111 of the first bearing 110 is locked onto the first locking projection 520, and the second protrusion 121 of the second bearing 120 is locked onto the second locking projection 620. However, the through holes 521 are formed only on the first locking projection 520. Accordingly, the bearings 100 are located on both sides of the open portion 0, but the through holes 521 are formed only on the first locking projection 520. Further, the pressurizing bars 400 are inserted only into the through holes 521 of the first locking projection 520.

The pressurizing bar bodies 410 of the pressurizing bars 400 are screw-coupled to the through holes 521. That is, the pressurizing bar bodies 410 move forward and backward as they rotate. To easily rotate the pressurizing bar bodies 410, the tool (e.g., wrench) is inserted into the insertion groove 420 of each pressurizing bar body 410, and using the tool, the pressurizing bar body 410 rotates easily.

The first scissor blade 500 and the second scissor blade 600 are fixed to each other by means of the fixing part 300. The fixing part 300 includes a first fixing part 310 inserted into the first and second open portions 01 and 02 in such a way as to come into contact with the inner races of the ball bearings 100 and a second fixing part 320 insertedly screw-coupled to the inside of the first fixing part 310. That is, the second fixing part 320 is screw-coupled to the inside of the first fixing part 310, and the inner races of the ball bearings 100 come into contact with the outer peripheral surface of the first fixing part 310. Accordingly, the first scissor blade 500 and the second scissor blade 600 are rotatable to each other around the fixing part 300 by means of the ball bearings 100. Under such a configuration, the first scissor blade 500 and the second scissor blade 600 are close to each other or separated from each other to perform hair cutting.

The first fixing part 310 includes a first cylinder 311 inserted into the first and second open portions 01 and 02 in such a way as to allow the second fixing part 320 to be coupled to the inside thereof and a first wing 312 formed to the shape of a plate on one side periphery of the first cylinder 311 to cover the first bearing 110. Further, the second fixing part 320 includes a second cylinder 321 screw-coupled to the inside of the first cylinder 311 and a second wing 322 formed to the shape of a plate on the other side periphery of the second cylinder 321 to cover the second bearing 120. That is, the second fixing part 320 is screw-coupled to the inside of the first fixing part 310 so that the first fixing part 310 and the second fixing part 320 are coupled to each other. In this case, the first bearing 110 is covered with the first wing 312 of the first fixing part 310, and the second bearing 120 with the second wing 322 of the second fixing part 320, so that if the first fixing part 310 and the second fixing part 320 are close to each other, the first bearing 110 and the second bearing 120 become close to each other, and accordingly, the first scissor blade 500 and the second scissor blade 600 become close to each other.

Figure 5:
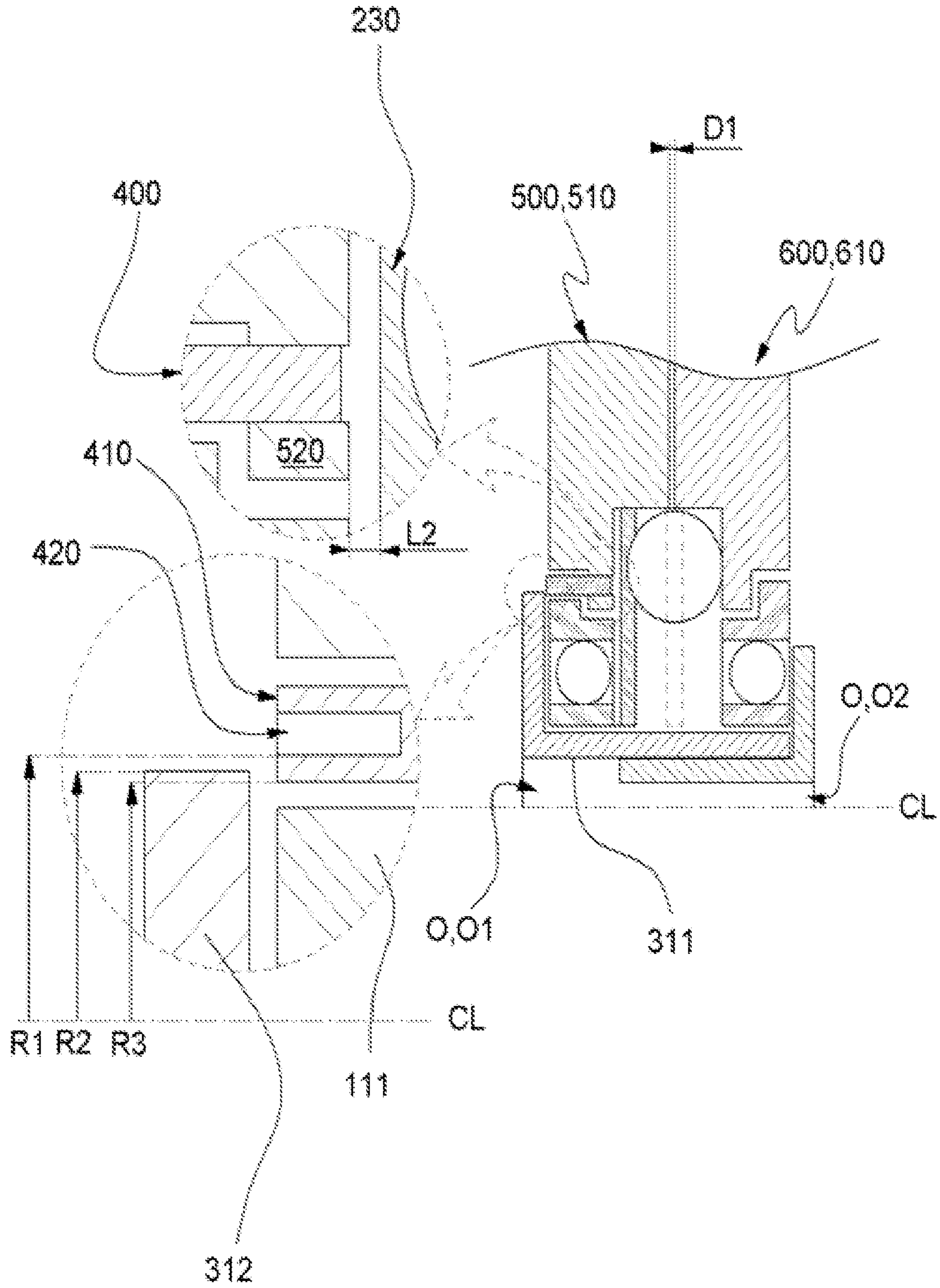

Further, an explanation of a size, that is, radius of the first wing 312 will be given with reference to FIG. 5. First, a relation among a radius R2 from a center line CL of the first open portion 01 to the end of the first wing 312, a radius R3 from the center line CL of the first open portion 01 to the underside of each pressurizing bar body 410, and a radius R1 from the center line CL of the first open portion 01 to the underside of each insertion groove 420 satisfies the following mathematical expression 1.

$$R3 < R2 < R1 \quad \text{(Mathematical expression 1)}$$

That is, as the radius R2 from the center line CL of the first open portion 01 to the end of the first wing 312 is bigger than the radius R3 from the center line CL of the first open portion 01 to the underside of each pressurizing bar body 410, a portion of each pressurizing bar body 410 is covered with the end of the first wing 312. Under such a configuration, the pressurizing bars 400 are prevented from escaping. Further, the radius R2 from the center line CL of the first open portion 01 to the end of the first wing 312 is smaller than the radius R1 from the center line CL of the first open portion 01 to the underside of each insertion groove 420. Under such a configuration, the insertion groove 420 is not covered with the first wing 312, but it is exposed to the outside. Accordingly, the tools for rotating the pressurizing bars 400 are inserted into the insertion grooves 420.

Further, the plurality of through holes 521 are formed around the open portion 0. Under such a configuration, the first scissor blade 500 and the second scissor blade 600 are fixed to each other in parallel to each other. That is, as mentioned above, the first scissor blade 500 and the second scissor blade 600 are coupled to each other by the fixing part 300. In this case, the first scissor blade 500 and the second scissor blade 600 may be arranged slant to each other so that they may not be in parallel to each other. According to the present invention, even in this case, the plurality of pressurizing bars 400 are inserted correspondingly to the plurality of through holes 521, and the inserted depths of the pressurizing bars 400 are adjusted individually to allow the first scissor blade 500 and the second scissor blade 600 to be in parallel to each other, thereby keeping the hair cutting performance of the scissors.

As well as the rolling elements 210 and the upper contact plate 230, the thrust bearing 200 may also include a lower contact plate. In this case, the lower contact plate may be the inner peripheral surface of the inwardly protruding second locking projection 620 formed unitarily with the second scissor blade 600.

As well known, the thrust bearing basically includes the rolling elements 210, the upper contact plate 230, and the lower contact plate, but if the components of the thrust bearing are included in the scissors, the scissors become thickened.

To solve such a problem, the lower contact plate is not adopted, and the inner peripheral surface of the inwardly protruding second locking projection 620 unitarily formed with the second scissor blade 600 may replace the lower contact plate, thereby making the thickness of the scissors remarkably reduced.

If necessary, further, ring-shaped seating grooves corresponding to the seating grooves 231 formed on the upper contact plate 230 are formed on the inner peripheral surface of the second locking projection 620 to allow the rolling elements 210 to be accurately rolled thereinto.

Figure 6:
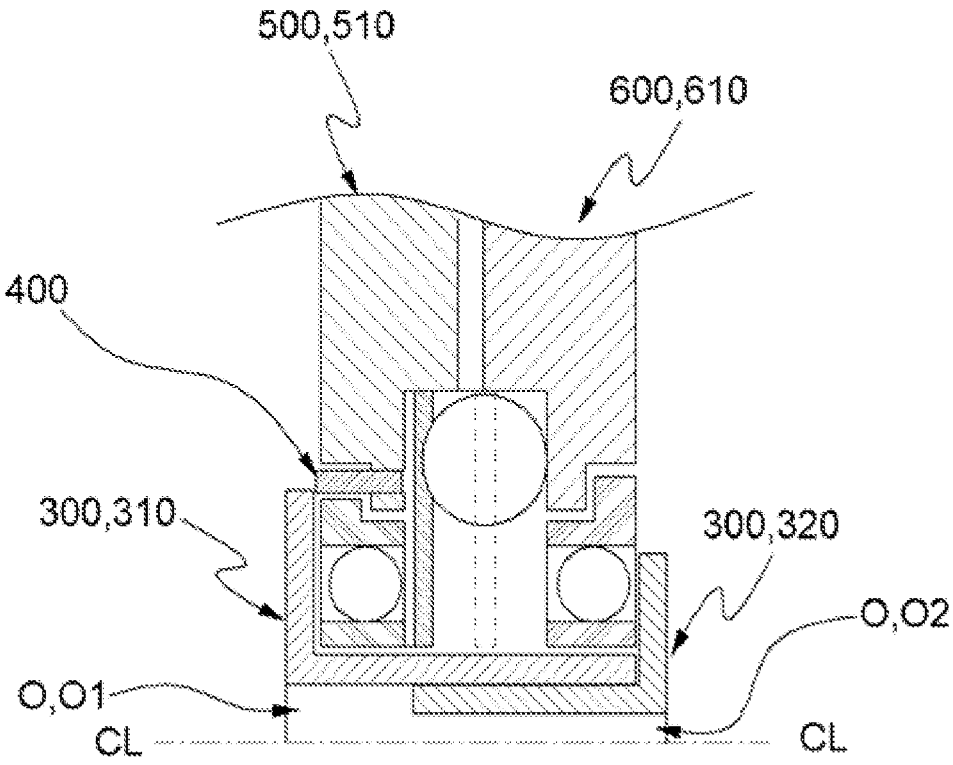
FIGS. 6 and 7 are schematic views showing a method for adjusting a distance of the scissors according to the present invention.
Figure 7:
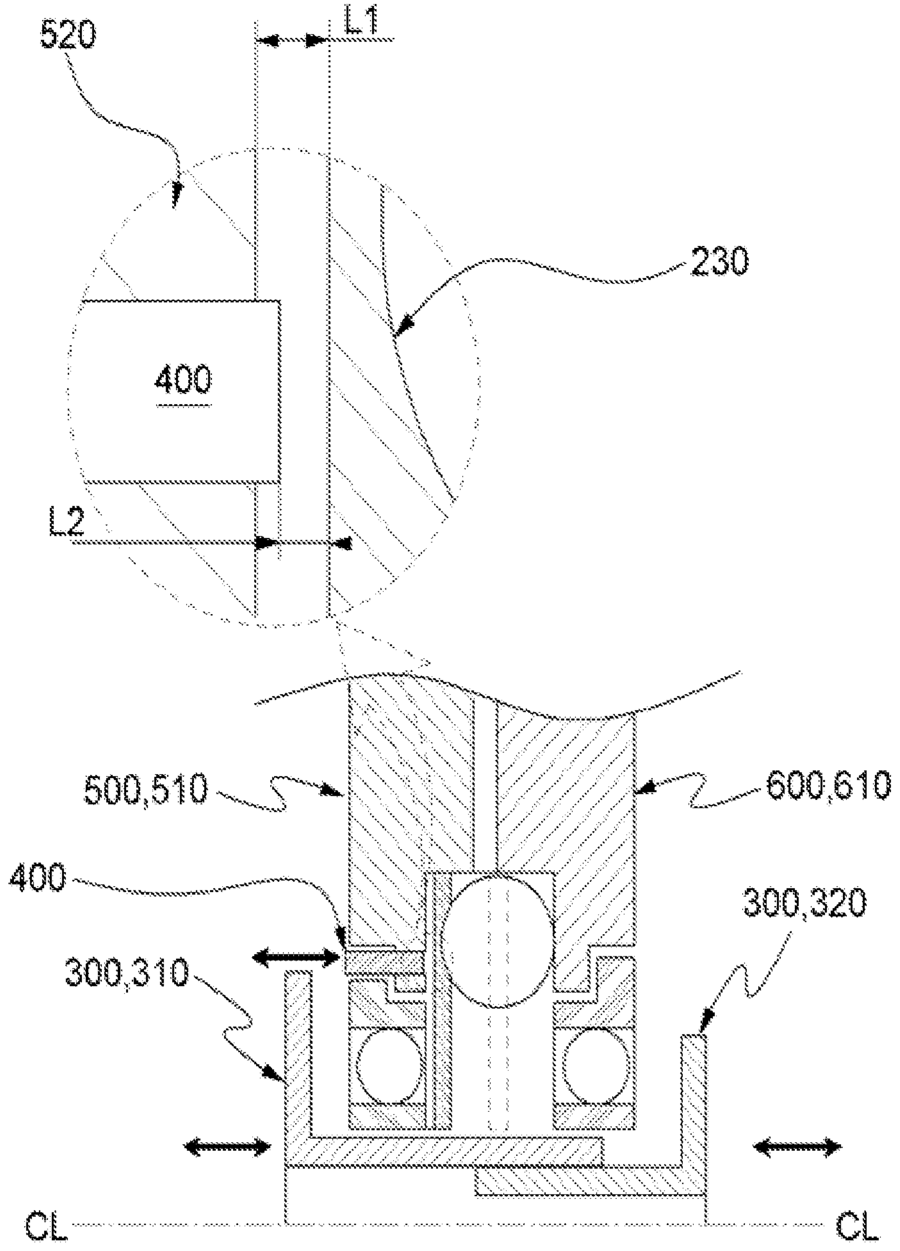

Hereinafter, a method for adjusting the distance of the scissors using the distance adjusting device according to the present invention will be explained with reference to FIGS. 5 to 7.

First, an initial state will be described. The pressurizing bars 400 are screw-coupled to the through holes 521, the first locking projection 520 is spaced apart from the upper contact plate 230 by a given distance L1, and the first fixing part 310 and the second fixing part 320 are coupled to each other, so that the first scissor blade body 510 and the second scissor blade body 610 are spaced apart from each other by a given distance Dl. The pressurizing bars 400 are screw-coupled to the through holes 521 in such a way as to be movable forward and backward.

If the distance between the first scissor blade 500 and the second scissor blade 600 is varied due to the use of the scissors, it is easily adjusted by means of the fixing part 300 and the pressurizing bars 400. That is, the first fixing part 310 and the second fixing part 320 of the fixing part 300 are spaced apart from each other by a given distance, and next, the pressurizing bars 400 move forward and backward to allow the first scissor blade 500 to move forward and backward. In detail, the distance between the first fixing part 310 and the second fixing part 320 is adjusted to primarily adjust the distance between the first scissor blade 500 and the second scissor blade 600, and next, the pressurizing bars 400 move forward and backward to secondarily adjust the distance between the first scissor blade 500 and the second scissor blade 600 finely.

In this case, the pressurizing bars 400 protrude from the through holes 521 by a given distance L2. Under such a configuration, a moving distance of the first scissor blade 500 is adjustable at the time when the first scissor blade 500 moves to the second scissor blade 600.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

It is therefore intended that the scope of the invention be limited not by this detailed description, but rather by the claims appended hereto.

EXPLANATIONS OF REFERENCE NUMERALS

| | |
|---|---|
| 100: Bearing | 110: First bearing |
| 111: First protrusion | 120: Second bearing |
| 121: Second protrusion | 200: Thrust bearing |
| 210: Rolling element | 230: Upper contact plate |
| 300: Fixing part | 310: First fixing part |
| 320: Second fixing part | 400: Pressurizing bar |
| 410: Pressurizing bar body | 420: Insertion groove |
| 500: First scissor blade | 600: Second scissor blade |

The invention claimed is:

1. A scissor, comprising:

a first scissor blade (500);

a second scissor blade (600) for hair cutting;

a fixing part (300) passing through an open portion (0) of the first scissor blade (500) and the second scissor blade (600) to couple the first scissor blade (500) and the second scissor blade (600) to each other;

a pair of ball bearings (100) coming into close contact with the inner peripheral surface of the open portion (0) in such a way as to insert the fixing part (300) thereinto; and a distance adjusting means disposed between the pair of ball bearings (100) to adjust a distance between the first scissor blade (500) and the second scissor blade (600), wherein the distance adjusting means comprises a thrust bearing (200) disposed between the pair of ball bearings (100) and pressurizing bars (400) inserted into one side of the first scissor blade (500) to pressurize the thrust bearing (200) so that the distance between the first scissor blade (500) and the second scissor blade (600) is adjusted by means of the forward and backward movements of the pressurizing bars (400).

2. The scissor according to claim 1, wherein the first scissor blade (500) comprises a plate-shaped first scissor blade body (510) on which a first open portion (01) is formed and a first locking projection (520) protruding inward from the side surface of the first open portion (01) facing the second scissor blade (600), the second scissor blade (600) comprises a plate-shaped second scissor blade body (610) on which a second open portion (02) is formed and a second locking projection (620) protruding inward from the side surface of the second open portion (02) facing the first scissor blade (500), the first open portion (01) and the second open portion (02) communicating with each other to form the open portion (0), and portions of outer races of the ball bearings (100) protrude to be locked onto the first locking projection (520) and the second locking projection (620).

3. The scissor according to claim 2, wherein the ball bearings (100) comprise a first ball bearing (110) disposed on the first open portion (01) and a second ball bearing (120) disposed on the second open portion (02), the first ball bearing (110) comprises a first protrusion (111) protruding from the portion of the outer race thereof in such a way as to be locked onto the first locking projection (520), the second ball bearing (120) comprises a second protrusion (121) protruding from the portion of the outer race thereof in such a way as to be locked onto the second locking projection (620), and the thrust bearing (200) comprises rolling elements (210) arranged between the first locking projection (520) and the second locking projection (620) and an upper contact plate (230) disposed inside the first locking projection (520) in such a way as to come into contact with the rolling elements (210) and having seating grooves (231) formed thereon to seat the corresponding rolling elements (210).

4. The scissor according to claim 3, wherein the first scissor blade (500) comprises through holes (521) formed on the first locking projection (520) to insert the pressurizing bars (400) thereinto, each pressurizing bar (400) comprises a pressurizing bar body (410) screw-coupled to the corresponding through hole (521) and an insertion groove (420) concavely formed on one side of the pressurizing bar body (410) to insert a tool thereinto, the fixing part (300) comprises a first fixing part (310) inserted into the first and second open portions (01) and (02) in such a way as to come into contact with inner races of the ball bearings (100) and a second fixing part (320) insertedly screw-coupled to the inside of the first fixing part (310), the first fixing part (310) comprises a first cylinder (311) inserted into the first and second open portions (01) and (02) in such a way as to allow the second fixing part (320) to be coupled to the inside thereof and a first wing (312) formed to the shape of a plate on one side periphery of the first cylinder (311) to cover the first bearing (110), and the second fixing part (320) comprises a second cylinder (321) screw-coupled to the inside of the first cylinder (311) and a second wing (322) formed to the shape of a plate on the other side periphery of the second cylinder (321) to cover the second bearing (120).

5. The scissor according to claim 4, wherein a relation among a radius (R2) from a center line (CL) of the first open portion (01) to the end of the first wing (312), a radius (R3) from the center line (CL) of the first open portion (01) to the underside of each pressurizing bar body (410), and a radius (R1) from the center line (CL) of the first open portion (01) to the underside of each insertion groove (420) satisfies the following mathematical expression 1:

$$R3<R2<R1 \quad \text{(Mathematical expression 1).}$$

6. The scissor according to claim 5, wherein the plurality of through holes (521) are formed around the open portion (0), and the plurality of pressurizing bars (400) are inserted correspondingly to the plurality of through holes (521).

7. The scissor according to claim 6, wherein the thrust bearing (100) comprises the rolling elements (210), the upper contact plate (230), and a lower contact plate.

8. The scissor according to claim 7, wherein the lower contact plate is replaced with the inner peripheral surface of the inwardly protruding second locking projection (620) formed unitarily with the second scissor blade (600) so that no additional lower contact plate is needed to thus make the thickness of the scissors reduced.

* * * * *